March 24, 1964   A. SIMMON   3,125,926
CONSTANT FOCUS ADJUSTABLE PROJECTOR
Filed March 10, 1960   2 Sheets-Sheet 1

INVENTOR.
ALFRED SIMMON
BY Jerome Bauer
ATTORNEY.

March 24, 1964  A. SIMMON  3,125,926
CONSTANT FOCUS ADJUSTABLE PROJECTOR
Filed March 10, 1960  2 Sheets-Sheet 2

INVENTOR.
ALFRED SIMMON
BY Jerome Bauer
ATTORNEY.

UNITED STATES PATENT OFFICE 3,125,926
Patented Mar. 24, 1964

3,125,926
CONSTANT FOCUS ADJUSTABLE PROJECTOR
Alfred Simmon, Garden City, N.Y., assignor to Laboratory Furniture Co., Inc., Mineola, N.Y., a corporation of New York
Filed Mar. 10, 1960, Ser. No. 14,026
15 Claims. (Cl. 88—24)

This invention relates to a projector and more particularly to a projector of the type that will project horizontally or vertically disposed images.

In the past projectors have been restricted in their use by being able to project images disposed in only one plane, that is, either in a vertical plane or in a horizontal plane. There are times, however, when it is desirable to be able to project an image from more than a single plane. Thus, for example, it may be desirable to project from more than one plane the image of a chemical action that may take place within a transparent vessel. In such cases the chemical action may be more easily observed when the plane of projection can be varied to more clearly see the experiment from different angles.

Accordingly, it is the desideratum of this invention to provide an apparatus that can project images which are disposed in more than one plane.

It is another object of this invention to provide a projector that may be easily and quickly manipulated to variably move the optical axis of the projector to a plurality of image projecting positions.

In carrying forth the objects a feature of the invention resides in the novel and inexpensive arrangement of structural details that enables the movement of the optical axis simply and quickly between a plurality of image projecting positions without varying or in any way affecting the point of focus of the projector.

Still another object resides in the provision of a projector in which the point of focus of its optical axis is fixed and of which a feature of the invention is the ability to interpose an image reflecting mechanism at the point of focus so the image may be reflected to a lens that will magnify the same on a desired surface without losing the focus of the image. Accordingly, the invention obviates the need to refocus the apparatus each time the optical axis of the projector is varied in position.

Figures 1, 2:
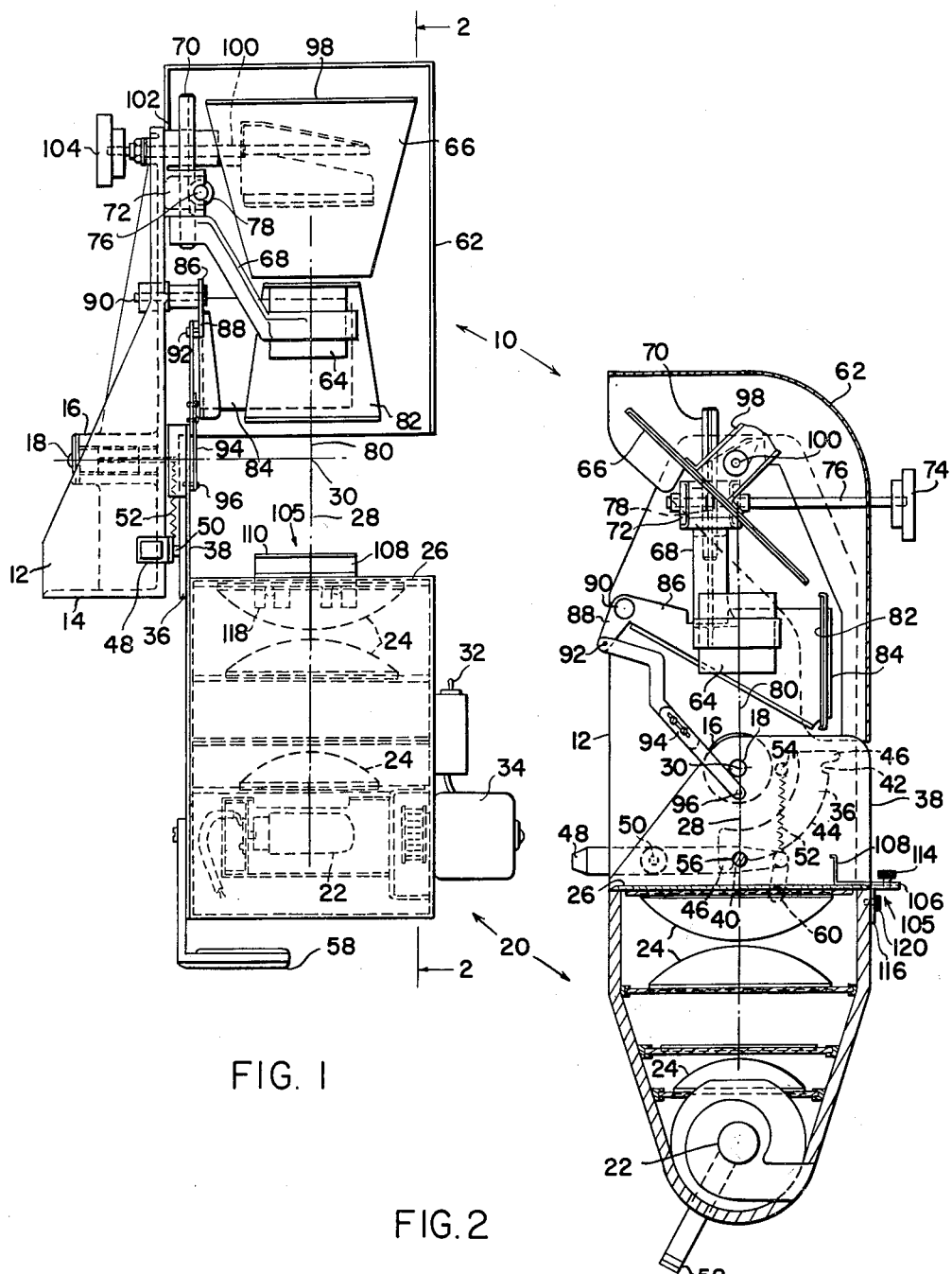
Figures 3, 4, 5:
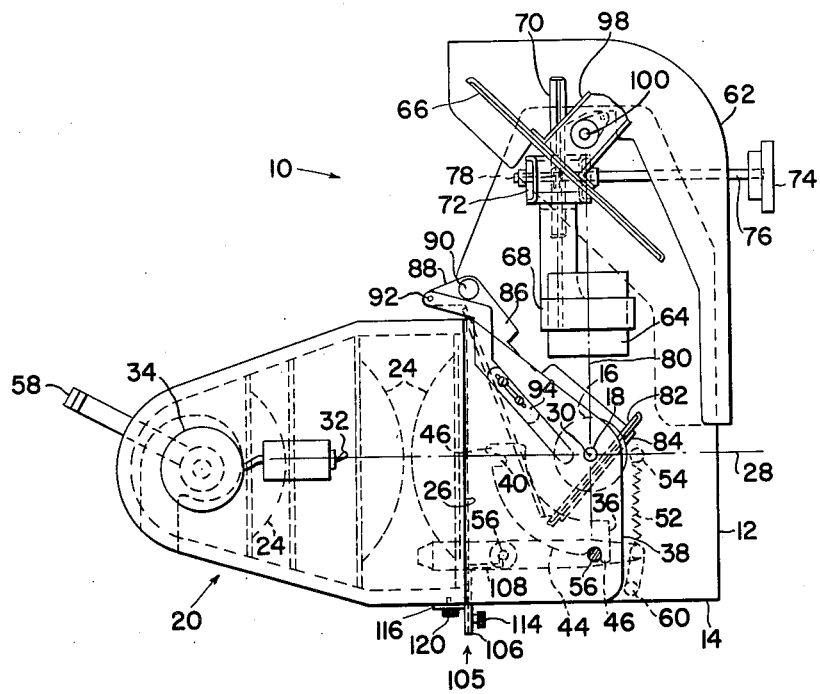

Other and further objects of my invention reside in the structures and arrangements hereinafter more fully described with reference to the accompanying drawings in which:

FIG. 1 is a front view of a projector constructed in accordance with the teaching of the invention and showing the parts thereof in position to project horizontally disposed images, FIG. 2 is a section of FIG. 1 taken in the direction of arrows 2—2, FIG. 3 is a side view similar to FIG. 2 with the lamphouse in position to project vertically disposed images, FIG. 4 is a partial view of the apparatus depicting the operation of the position retaining mechanism, and FIG. 5 is a perspective view of the auxiliary table for supporting vertically disposed images.

Referring now to the drawings, the projector apparatus there shown is generally identified by the numeral 10 and comprises a frame 12 of rigid construction that is adapted to be supported at its underside 14 on any convenient surface. The frame 12 is provided with a boss 16 that has a pivot pin mounting 18 centrally positioned therein.

Mounted for pivotal movement on the pin 18 is a housing generally identified by the numeral 20. The housing 20 includes a lamp 22 therein and a plurality of condenser lenses 24. Covering the top of the housing 20 is a plate 26 referred to hereafter as the focal plane. Thus, the housing 20 comprises adequate structure for projecting images that may be placed on or adjacent to the focal plane 26. For this reason, therefore, the housing is sometimes referred to herein as a projector housing or as a lamphouse. Any one of these reference terms is adequate and used interchangeably to indicate that there is adequate structure included within the housing 20 to project the image placed on or adjacent to the focal plane 26 along an invisible optical axis 28 that has a point of intersection 30 positioned in horizontal alignment with the axis of the pivot pin 18. Although the further details of the projector structure included within the housing 20 form no part of the present invention, there is shown in the drawings a switch 32 that controls the operation of the lamp 22 and a blower motor 34.

The housing 20 is adapted to be pivotly moved from its position as shown in FIGS. 1 and 2, wherein the optical axis 28 is vertically disposed and its focal plane 26 is horizontally disposed, to a position as shown in FIG. 3 wherein its optical axis 28 is in a horizontal direction and its focal plane 26 is positioned vertically. It will be noted that in either position of pivotal movement of the housing 20, the intersection point 30 remains fixed despite the fact that the optical axis 28 is moved and varied between vertical and horizontal directed positions.

Those skilled in the art will readily recognize that when the housing 20 is positioned as shown in FIGS. 1 and 2, an image for projection may be seated on the focal plane 26 in line with the optical axis 28. Hence, the image may be said to be horizontally disposed. In similar manner, when the housing 20 is positioned as in FIG. 3 and an image is placed in upstanding or upright position against or adjacent to the focal plane 26, the image may be said to be vertically disposed. Hence, a side view of the image may be projected by the projector structure in the housing 20.

In order to move and retain the housing 20 in either one of its predetermined horizontal and vertical positions, there is included a retaining mechanism that comprises a sector-shaped member 36. The member 36 is fixed to the inside of an upstanding wall 38 forming a side of the housing 20 and that pivotly mounts the housing to the pivot pin 18. Sector member 36 is provided with a plurality of engaging surfaces defined by notches 40 and 42. The notches are connected together by an arched bearing surface 44 that is formed along a radius less than the extreme ends 46 of the member 36 which serve as radially protruding stops.

A release handle 48 is pivoted on the frame 12 intermediate its ends at 50. Referring to FIG. 2 it will be noted that the left hand side of the handle 48 extends beyond the side of the frame 12 so that it may be manually grasped and pivoted at 50. The opposite end of the handle is connected with a lower end of a spring or other resilient member 52 that is mounted to the frame 12 at its upper end 54. The resilient member 52 applies a constant biasing force to the handle 48 causing the connected end thereof to pivot upwardly toward the sector member 36. A retaining pin 56, mounted in the handle 48, is thereby constantly urged toward engagement with the surface of an adjacent one of the notches 40 and 42 after riding along the arched bearing surface 44 therebetween in the manner as shown in FIG. 4.

A manipulated handle 58 is secured to the inside of the wall 38 and extends beyond the housing 20 so that it may be manually grasped and lifted. Consequently, when it is desired to vary the position of the housing 20 and to relocate its focal plane 26 and the optical axis 28 of the projector structure included therewithin from the position shown in FIGS. 1 and 2 to that shown in FIG. 3, the handle 58 is grasped by the operator. It may be held by the operator while the release handle 48 is physically lifted or moved upwardly about the pivot 50 to lower the retaining pin 56 from cooperative engagement with the notched surface 40 in opposition to the normal biasing function of the spring 52. Thereafter, the handle 58 is lifted to swing the housing 20 into the position as shown in FIG. 3.

In the meanwhile, release handle 48 may be released after its pin 56 is disengaged from the notched surface 40. Continued lifting of the handle 58 will move the housing 20 and its attached sector member 36 through the intermediate pivoting position as shown in FIG. 4 whereby the arched bearing surface 44 thereof rides over the retaining pin 56 that is biased into engagement therewith by the resilient member 52.

When the housing 20 is lifted to a position wherein the optical axis 28 is horizontally disposed and its focal plane 26 aligned in a vertical plane, the sector-shaped member 36 will have moved into a position as to present its notched engaging surface 42 into alignment with the retaining pin 56 which will then automatically become engaged therewith as shown in FIG. 3. It might be noted that the initial pivoting movement of the handle 48 for disengaging the pin 56 from either of the notched surfaces 40 and 42 is limited by the location of a stop member 60 fixed to the frame 12 and that will be abutted during the pivoting movement of the handle. The adjacent radially elongated ends 46 prevent the sector 36 from overriding the pin 56 and aids in assuring the engagement of the same with the notched engaging surfaces 40 and 42.

Mounted on the upper portion of the frame 12 is a hood-shaped member 62 that serves to partially enclose a lens 64 and a mirror 66 having a planar reflective surface that is trapezoidal in shape. The lens 64 is mounted in a bracket 68 that is in turn secured at its upper end to an adjustment rod 70. The adjustment rod 70 is guided for vertical movement with respect to the frame 12 in a bifurcated boss 72.

A rotatable knob 74 is secured to a rod 76 that is bearingly mounted for rotation in the bifurcated boss 72 and carries on it an adjustment wheel 78 that is positioned between the bifurcations of the boss. The wheel 78 bears against the rod 70 so that rotation of the knob 74 will facilitate raising or lowering the rod 70 and the lens 64 toward or away from the intersection point 30. The optical axis of the lens 64 is fixed with respect to the frame 12 and positioned for coinciding or intersecting vertical alignment with the optical axis 28 of the projection structure in the housing 20, when such axis 28 is positioned vertically as shown in FIGS. 1 and 2.

When the housing 20 is positioned horizontally as shown in FIG. 3 wherein the optical axis 28 of the projector elements therein is also horizontally disposed, the point of intersection 30 remains fixed at the center of the pivotal axis of the mounting pin 18. However, the optical axis 28 is then arranged in perpendicular intersecting relationship with the optical axis 80 of the lens 64. When the optical axis 28 is positioned horizontally as shown in FIG. 3 and the projector structure in the housing 20 serves to project images that are vertically disposed adjacent to the focal plane 26, it is necessary to interpose a reflective mechanism at the focal point that will transmit the image therefrom to the magnifying lens 64.

Included in the present invention is a reflective mechanism comprising a planar reflector 82 that is suitably retained on a bracket 84 that forms a part of a bell crank lever 86. The reflector 82 is also of trapezoidal shape and is a smaller mirror-hand image of the mirror 66, to be more fully described hereafter. The bell crank lever 86 has an offset arm 88 that is pivoted intermediate its ends at 90 to the frame 12. Its other end 92 is connected by an adjustable link 94 for movement with the housing 20 facilitated by the pivot connection 96.

Those skilled in the art will readily recognize that the connection 96 is located on the wall 38 in alignment with the optical axis 28 of the projection structure incorporated in the housing 20. Hence, it will be understood that when the housing 20 is moved between its position as shown in FIGS. 1 and 2 and the position shown in FIG. 3, the link 94 will serve to actuate the lever 86 about its pivot 90 to move the same correspondingly and to predeterminately position the planar reflector 82 at the point of intersection 30 of the optical axes 28 and 80. The reflector 82 is moved into a predetermined position of angular relationship between the projection structure of the housing 20 and the lens 64 as to reflect the projected images received thereby along optical axis 28 to the lens along its respective optical axis 80. The predetermined relationship of angular interposition of the reflector 82 between the housing 20 and its included projector structure and the lens 64 is shown more clearly in FIG. 3.

Quite obviously, when the housing 20 is in its position as shown in FIGS. 1 and 2, the reflective member 82 will be positioned away from and out of the path of the optical axes of the lens and projector structure of the housing. Thus, the reflector 82 is moved to intersection point 30 only when and in response to the movement of the optical axis 28 into perpendicular disposition with respect to the optical axis 80 of the lens 64, and thus serves to reflect the image from the intersection 30 to the lens 64 along the optical axis 80.

The planar mirror 66 is positioned in alignment with the optical axis of the lens 64 and, therefore, receives the magnified image therefrom and serves to reflect the same onto any desired screen or surface (not shown) in the direction of which the same faces. Because it may be desirable at times to raise or lower the location of the image on the screen or surface, the mirror 66 is angularly adjustable. The mirror 66 is secured to a bracket 98 that is fixed to a rotatable rod 100. The rod 100 extends through a boss 102 formed on the frame 12 and has a knob 104 (FIG. 1) fixed thereto. Accordingly, rotation of the knob 104 will pivot the mirror 66 to change its angular relationship to the optical axis 80 of the lens 64 thus enabling the image cast upon a surface thereby, to be raised or lowered.

In order to enable the support of a member from which an image is to be projected on or adjacent to the focal plane 26 when the housing 20 is in its horizontal position as shown in FIG. 3, there is provided an auxiliary table 105, see FIG. 5. The table 105 comprises a substantially Z-shaped bracket having a body portion 106, a seating or supporting flange 108 and a lip 110. The body 106 is slotted at 112 to permit the passage of threaded locking pins 114 therethrough for engagement with a connector bracket 116 made in the form of an inverted L. Bracket 116 is provided with a plurality of slotted legs 118 through which locking screws 120 may pass to secure the same to the housing 20 in the manner shown in FIGS. 2 and 3. If it is desired to raise or lower the seating flange 108 along and relative to the focal plane 26 to either raise or lower the image member that may be seated thereon, the locking pins 114 are unscrewed a few turns to release and enable the body 106 to be moved and adjusted relative to the bracket 116 locked to the housing at 120.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In an apparatus for projecting images from a plurality of positions, a frame, a housing including means aiding in projecting images, means connecting said frame and housing for relative movement into a plurality of predetermined image-projecting positions, means movable into the path of the projected images to reflect the same in response to the relative movement of said frame and housing into a predetermined one of said plurality of positions and out of the path of the projected images in response to the relative movement of said frame and housing into another of said plurality of predetermined positions, means responsive to the relative movements of said frame and housing to move said movable means into said plurality of predetermined positions, lens means to receive the reflected images in said predetermined one position and to receive the projected images directly from said projecting means in said other predetermined position, and means between said frame and housing to retain the same in their plurality of positions.

2. In an apparatus for projecting images from a plurality of positions, a fixed frame, a projector housing pivoted to said frame and having means aiding in projecting images along an optical axis, said housing being movable from a first to a second position, a lens having an optical axis aligned with the optical axis of said projecting means in the first position of said housing and being disaligned therewith in the second position of said housing, said optical axes having a point of intersection, means operable between said frame and housing to retain said housing in its two positions of movement without varying the location of said point of intersection of said optical axes, reflector means, and means responsive to the movement of said housing from said first position to said second position to move said reflector means automatically into the path of the optical axes of said projector means and said lens.

3. In an apparatus for projecting images positioned in horizontal and vertical planes, a projector housing movable to project images positioned in horizontal and vertical planes and including means aiding in projecting the images an unvarying optical distance, a frame having a pivot about which said housing moves, releasable means between said frame and housing to releasably retain said housing in position to project images in said horizontal and vertical planes, a plurality of image reflective means, and means connecting certain of said image reflective means with said housing to move said certain reflective means automatically into and out of image reflecting position at said optical distance in response to the movement of said housing.

4. In a projector, a frame, a projector housing pivoted for movement on said frame between first and second positions and including a focal plane and means aiding in projecting images, lens means on said frame, reflector means, means movably connecting said reflector means to move the same to a position to reflect images from said image projector means to said lens in response to the movement of said housing to said first position and away from said reflecting position in response to the movement of said housing to said second position, means between said frame and housing to releasably retain said housing in its first and second positions of movement, and means mounting said housing on said frame for movement between said first and second positions without varying the optical distance between said focal plane and lens means.

5. A projector comprising a frame, a lens and mirror on said frame having an optical axis, a projector housing including a focal plane and means aiding to project images from said focal plane along an optical axis, means connecting said housing with said frame for movement relative thereto to align and disalign said optical axes without varying the focal distance between said focal plane and said lens, means to releasably retain said housing in position when the same is moved to axis aligning and disaligning positions, reflector means movable into angular relationship between said disaligned optical axes to intercept the same in response to the axes disaligning movement of said housing to reflect images projected by said projection means to said lens, and means to move said reflector means in response to said axes disaligning movement.

6. In a projector, a frame fixed from movement, a housing having a focal plane and including projector means fixed therein for movement therewith and aiding in projecting an image along an optical axis through said focal plane, lens means on said frame having an optical axis, means mounting said housing on said frame to enable the same to be moved from a position whereby said optical axes are aligned and to a position whereby said optical axes perpendicularly intersect each other without varying the focal distance between said focal plane and said lens means, reflector means, and means connecting said reflector means with said housing for movement to an angular position between said perpendicularly intersecting optical axes in response to the movement of said housing disaligning said axes.

7. In a projector, a frame, lens on said frame having an optical axis, a housing pivoted on said frame for movement relative thereto and including a focal plane and projector means aiding in projecting images along an optical axis passing through said focal plane and movable between an axially aligned and a perpendicularly intersecting relationship with respect to the optical axis of said lens in response to the pivoting movement of said housing, a planar reflector, lever means pivoted on said frame and mounting said reflector, link means connecting said lever means with said housing to move said lever means and reflector in response to the movement of said housing to predeterminately position the plane of said reflector at the intersection of the optical axes of said lens and projector means when the same are positioned in perpendicular intersecting relationship, and means to pivot said housing on said frame for said relative movement without varying the focal distance between said focal plane and lens.

8. An apparatus for projecting horizontally and vertically disposed images comprising a housing, a focal plane fixed on said housing, projector means in said housing having an optical axis passing through said focal plane, means to support an image adjacent to said focal plane, a frame, a lens on said frame having an optical axis, means mounting said housing to said frame for movement between a plurality of positions relative thereto to enable said optical axis of said projector means to move from an axially aligned position with respect to the optical axis of said lens to project vertically disposed images to an intersecting position axially disaligned therefrom to project horizontally disposed images, reflector means having a planar surface movable to the intersection of said disaligned optical axes, bell crank lever means movably mounted on said frame intermediate the ends thereof and mounting said reflector means thereon at one end thereof, link means pivotly connecting said housing and the other end of said lever means to move the latter in response to the movement of the former to position said reflector means at the intersection of said disaligned optical axes and away from said axes when the same are aligned with each other, and retaining means between said frame and housing to retain said housing in each of its plurality of positions of movement.

9. An apparatus as in claim 8, said retaining means comprising a member fixed on said housing for movement therewith and including engaging surfaces defined thereon, a handle pivoted on said frame and having retaining means thereon for releasable engagement with said engaging surfaces, and resilient means on said frame biasing said handle to move said retaining means into engagement with said engaging surfaces.

10. An apparatus as in claim 8, and mirror means on said frame aligned with the optical axis of said lens.

11. An apparatus as in claim 10, means connected with said mirror to adjust the angle thereof with respect to the optical axis of said lens.

12. In a constant focus adjustable projector, projector means aiding to project an image along an optical axis at a fixed focal point, lens means having an optical axis along which the projected image is received, means mounting said projector and lens means with their optical axes in intersecting relationship, operable means to movably vary the angular intersecting relationship of the optical axes respectively of said lens and projector means to each other without varying the point of intersection of said optical axes of said projector means and lens means, reflector means, means connected with said operable means to move said reflector means to the point of intersection of said optical axes when said optical axes are moved into a predetermined angular intersecting relationship and to move said reflector means away from the point of intersection of said optical axes when said optical axes are moved into a different predetermined angular intersecting relationship.

13. In a constant focus adjustable projector as in claim 12, retaining means fixed with respect to said lens means, and means on said operable means cooperable with said retaining means to maintain the optical axes of said lens and projector means in their predetermined angular intersecting relationship.

14. In a constant focus adjustable projector as in claim 12, said connecting means comprising a bell crank lever pivoted intermediate its ends on said projector and mounting said reflector means at one end thereof, link means connecting the other end of said bell crank lever with said operable means for movement in response to the operation of said operable means.

15. In a constant focus adjustable projector as in claim 12, a planar mirror on said projector aligned with the optical axis of said lens means and including means thereon to adjust the angular relationship thereof relative to the optical axis of said lens means.

References Cited in the file of this patent

UNITED STATES PATENTS

| | | | |
|---|---|---|---|
| 2,079,233 | Wappler | May 4, | 1937 |
| 2,468,596 | Geis et al. | Apr. 26, | 1949 |
| 2,603,125 | Evers | July 15, | 1952 |
| 2,806,406 | Boughton | Sept. 17, | 1957 |
| 2,859,660 | Lucas | Nov. 11, | 1958 |
| 3,053,145 | Savin | Sept. 11, | 1962 |

FOREIGN PATENTS

| | | |
|---|---|---|
| 14,889 | Great Britain | of 1894 |
| 17,059 | Great Britain | of 1893 |